March 9, 1937.  C. H. KINDL ET AL  2,073,158
COMBINED MOTOR MOUNTING AND BELT TIGHTENER
Filed June 29, 1934   2 Sheets-Sheet 1

INVENTORS
Carl H. Kindl and Clement J. Rowe
BY
Spencer Hardman & Fehr
their ATTORNEYS March 9, 1937.   C. H. KINDL ET AL   2,073,158
COMBINED MOTOR MOUNTING AND BELT TIGHTENER
Filed June 29, 1934   2 Sheets-Sheet 2

INVENTORS
Carl H. Kindl and Clement J. Rowe
BY
Spencer Hardman and Fehr
their ATTORNEYS Patented Mar. 9, 1937

2,073,158

UNITED STATES PATENT OFFICE 2,073,158

COMBINED MOTOR MOUNTING AND BELT TIGHTENER

Carl H. Kindl and Clement J. Rowe, Dayton, Ohio, assignors to General Motors Corporation, Detroit, Mich., a corporation of Delaware Application June 29, 1934, Serial No. 732,983

20 Claims. (Cl. 74—242.13)

This invention relates to a combined motor mounting and belt tightener particularly of the self-adjusting type.

It is an object of the present invention to tighten the belt on an electric motor in response to the load thereon.

This object is accomplished by supporting the motor for rotation about an axis parallel to the rotor axis and extending approximately through the line of transmission of the rotor torque to the belt wherefore only the reactionary stator torque has a tendency to rock the motor about its pivot axis and thereby tighten the belt.

It is another object of the present invention yieldingly to resist rotation of the motor about its pivot axis to such an extent that slight changes in the motor load or slight pulsations thereof do not cause a corresponding change of the belt tension.

This object is accomplished in one aspect of the invention by a combination including means supporting the motor for rotation about an axis which is parallel to the motor shaft and extends approximately through the belt portion to which the motor torque is applied; means frictionally resisting rotation of the motor about said axis; and yielding means tending to rock the motor about said axis so as to tighten the belt.

Further objects and advantages of the present invention will be apparent from the following description, reference being had to the accompanying drawings wherein a preferred embodiment of the present invention is clearly shown.

In the drawings:

Fig. 5 is a diagrammatic illustration of the motor position in normal running condition.

Fig. 6 is a diagrammatic illustration of the motor position in starting condition.

Fig. 7 is a chart disclosing the relationship which exists between the motor torque and the motor speed.

Figure 2:
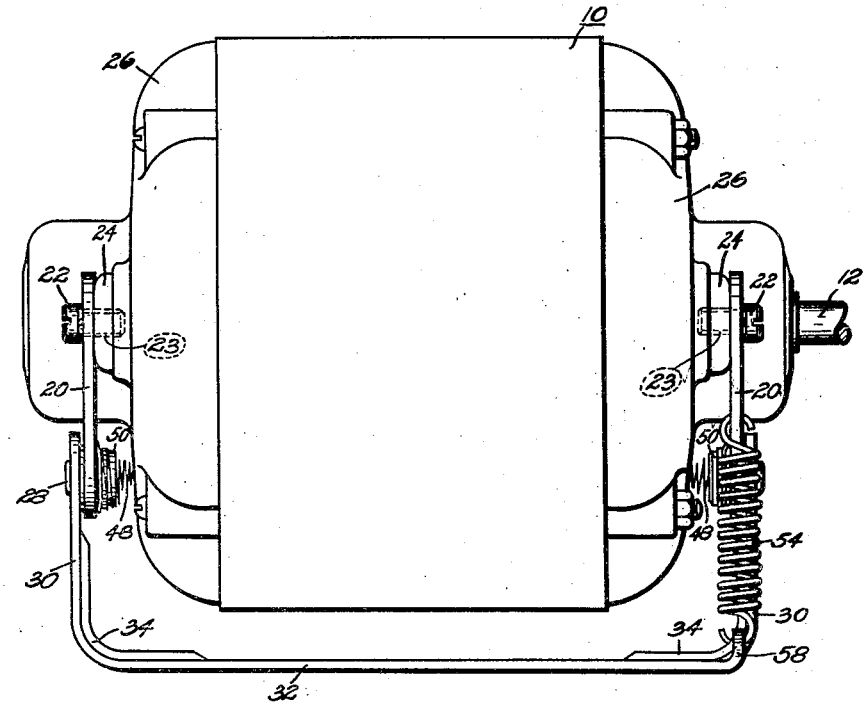
Fig. 2 is a side elevation of the motor mounting as viewed in the direction of arrow 2 in Fig. 1.
Figures 3, 4:
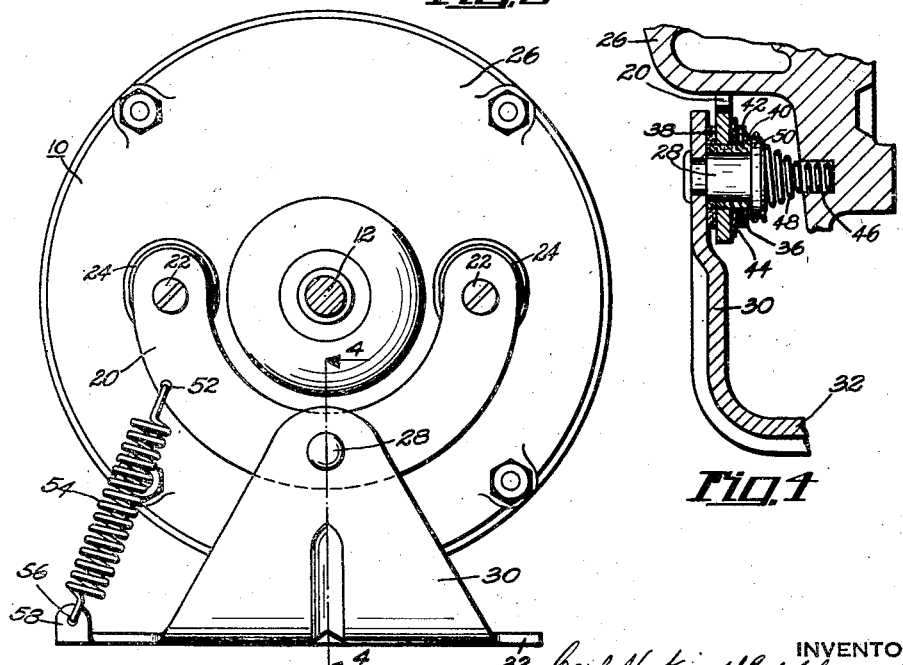
Fig. 3 is a front elevation of the motor mounting similar to Fig. 1.
Fig. 4 is a fragmentary section taken on the line 4—4 of Fig. 3.

Referring to the drawings, the reference numeral 10 designates an electric motor such as used for refrigeration purposes. This motor is provided with a conventional stator and rotor (not shown) and a motor shaft 12 on which is mounted a V-grooved pulley 14. A belt 16 of any suitable fabric compound drivingly connects the motor pulley 14 with the pulley 18 of any conventional compressor (not shown). As best shown in Figs. 2 and 3, arcuate brackets 20 are attached to rubber plugs 24 in the two motor end frames 26 by means of screws 22 which are threaded into metal inserts 23 of the rubber plugs thereby floatingly pivotally mounting these brackets to the motor. Each one of the arcuate brackets 20 is furthermore pivotally supported to a projecting flange 30 of a base plate 32 which is reenforced in the corners by ribs 34. Referring more particularly to Fig. 4, the pivots 28 do not contact the arcuate brackets since bushings 36 of suitable fibrous insulating material are interposed between said pivots and said arcuate brackets. The brackets 20 are furthermore held out of contacting engagement with the projecting flanges 30 of the base plate by means of washers 38 of the same material as the bushings 36. These washers 38 are interposed between the flanges 30 and the brackets 20. Each one of the insulating bushings 36 is provided with an annular shoulder 40 between which and the adjacent arcuate bracket there is interposed a metal washer 42 and a dished spring 44 which normally urges said arcuate bracket into frictional engagement with the adjacent insulating washer 38. The two motor end frames 26 are provided with recesses 46, each one of which receives one end of a conical helical spring 48, the other end of which bears against the metal washer 42. Part of a convolution of each of these springs 48 rests against the head 50 of a pivot 28, thereby making electrical contact between the motor end frames 26 and the pivots 28 which in turn are in electrical contact with the base plate 32 as more particularly shown in Fig. 4. In this manner the electric motor is grounded by intermediation of the springs 48, the pivots 28 and the base plate 32. The springs 48 furthermore yieldingly prevent any end-play of the motor as can be readily understood. The rubber plugs 24, constituting the sole support for the motor on the arcuate brackets 20, damp motor vibrations and absorb motor noises. Secured at 52 to one of the arcuate brackets 20 is one end of a tension spring 54 the other end of which is secured at 56 to a lug 58 of the base plate 32. This spring 54 has a tendency to rock the motor counter clockwise about its pivot support thereby initially tightening the belt 16.

Figure 1:
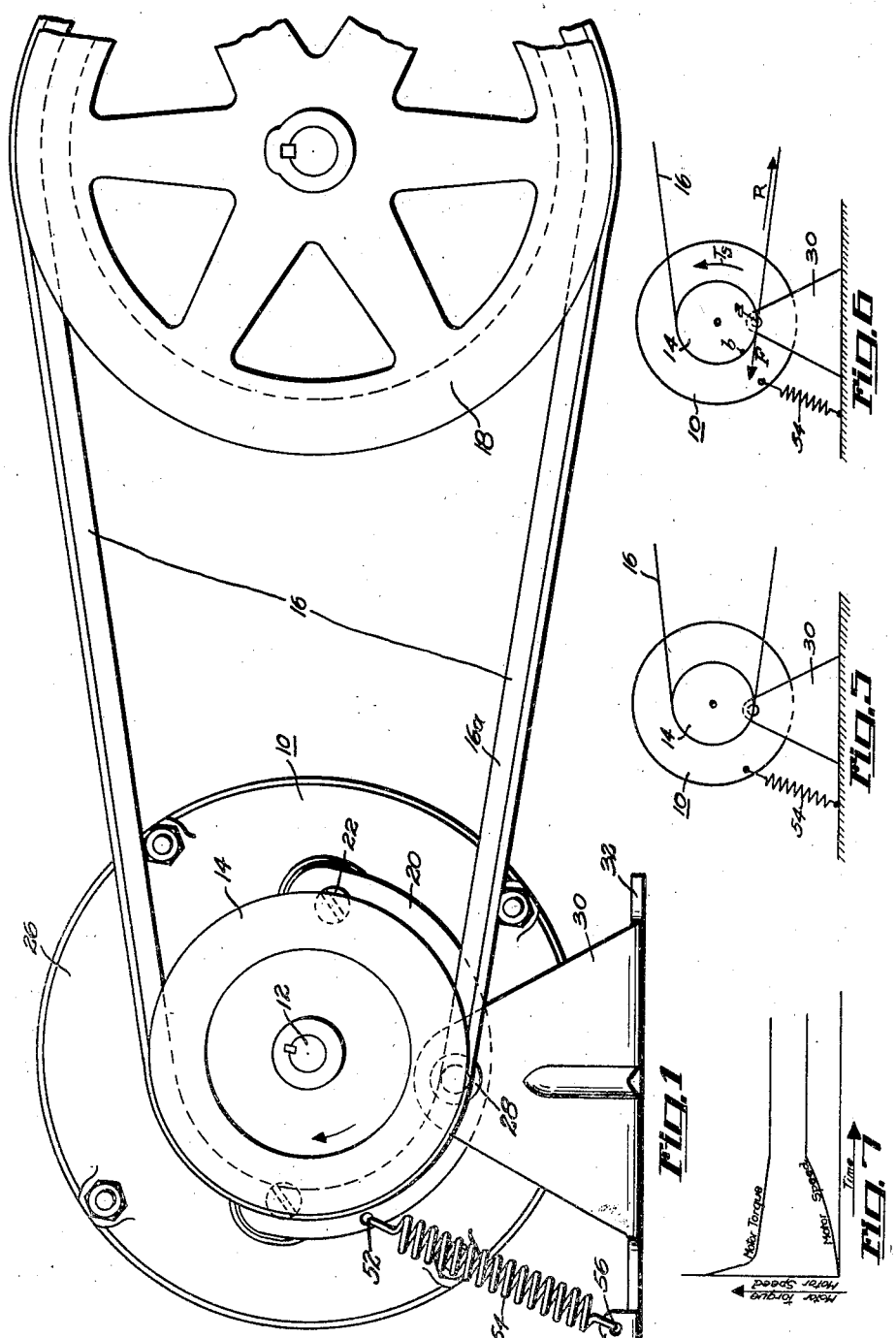
Fig. 1 is a front elevation of a motor mounting accomplishing the objects of the present invention.

As best shown in Fig. 1, the pivot support of the motor is on substantially the same level as the mean diameter of the V-groove of the motor pulley 14, and is more particularly positioned at the point where the driving side 16a of the belt contacts said motor pulley. Referring to Fig. 6 and assuming that the electric motor has just been connected to any suitable electric power source in any suitable manner and that the belt does not slip, it is then obvious that before the rotor actually rotates, the rotor torque has at least to exceed the resistance R which is composed of the considerable static friction of the relatively movable compressor parts and the force which it takes in order to accelerate the mass of the relatively movable compressor parts from a complete resting condition. The rotor torque expresses itself to the belt in form of a force F which acts substantially in the mean diameter of the V-groove of the motor pulley. The rotor torque grows so rapidly that the force F exceeds the resistance R almost instantaneously after the motor has been connected with a power source, yet in reality and for practical considerations a short time interval elapses before the rotor torque overcomes the resistance R. Since the reactionary torques of the stator is equal to that of the rotor at all times, it follows that during the short interval while the rotor torque grows and eventually exceeds the resistance R, the accordingly increasing reactionary torque of the stator tends to rock the motor counter-clockwise about its pivot support as viewed in Fig. 6. Referring to Fig. 7, the comparative curves show the relationship which exists between the motor torque and the motor speed starting from a resting condition of the motor. It is obvious that the motor torque at the start of the motor has to be considerable in order to overcome the earlier explained resistance R. As soon as the rotor starts to rotate and the compressor starts to run the motor torque drops abruptly since the static friction of the compressor parts has been overcome. After a sudden drop of the motor torque the same continues to drop more gradually until the rotor gains full and constant speed whereafter the motor torque is constant as long as the motor speed does not change. With this in mind it can be readily understood that during the short interval while the motor torque is growing until it overcomes the resistance R, the reactionary torque of the stator also grows very rapidly and since it is not counteracted by the rotor torque for a reason to be explained presently, actually rocks the motor counter clockwise about its pivot support a noticeable distance thereby greatly tightening the belt at a time when a maximum force is transmitted through the belt by frictional engagement with the pulleys. Such rocking of the motor as just explained is due to the fact that the rotor torque has no rocking influence upon the motor and therefore no reactionary influence upon the rocking tendency of the stator torque since the force F has practically no lever arm with respect to the pivot support of the motor. The assumption that the force F has no lever arm is practically though not theoretically sound, since the line of actual transmission of the rotor torque to the belt as represented by the distance a—b in Fig. 6 has some length due to the fact that the belt 16 is slightly resilient and grips a substantial portion of the V-groove of the motor pulley and not only that small section thereof on which the driving belt side 16a is a tangent. Therefore, the resulting transmitted force F has in reality a small lever arm which is, however so small that it can be neglected for all practical purposes and it may be practically assumed that the force F passes through the pivot support of the motor. Immediately after the rotor starts to rotate, the motor torque first decreases very abruptly and then more gradually until the rotor has gained normal operative speed as follows from the chart in Fig. 7. This sudden drop of the rotor torque naturally results in an equivalent drop of the stator torque and consequently in a rocking of the motor from the position shown in Fig. 6 to the normal running position shown in Fig. 5.

From all the foregoing it can be readily understood that the tension in the belt is directly responsive to the reactionary torque of the stator, the stator torque is equivalent to the rotor torque, and the torque is in turn responsive to the load on the motor, therefore the belt tension is responsive to the motor load. However, the responsiveness of the belt tension to the motor load should not be so fine that slight pulsations of the motor load in form of a compressor for instance, cause a correction of the belt tension. This is accomplished by means of the dished springs 44 which produce enough friction in the pivot support of the motor that the same may not freely rock about its pivot support upon a slight change in the motor load or upon slight pulsations thereof. From the foregoing description of the structure and mode of operation of this combined motor mounting and belt tightener, it is apparent that the invention, in one form, comprises chiefly a belt-driving electric motor (motor 10 driving belt 16), means (pivots 28) supporting the motor 10 for rotation about an axis (axis through pivots 28) which is parallel to the motor shaft 12 and extends approximately through the portion of belt 16 to which the motor torque is applied.

Among the advantages of this belt tightener and motor mounting are the following:

(1) The motor reaction torque effects an even tightening force upon the belt.

(2) Unevenness of the load on the motor does not cause jumping of the motor and belt.

(3) The structure can be uniformly and easily made and assembled in production.

While the embodiment of the present invention as herein disclosed, constitutes a preferred form, it is to be understood that other forms might be adopted, all coming within the scope of the claims which follow.

We claim:

1. In combination with a belt-driving electric motor, means supporting the motor for rotation about an axis which is parallel to the motor shaft and extends approximately through the belt portion to which the motor torque is applied.

2. In combination with a belt-driving electric motor, means supporting the motor for rotation about an axis which is parallel to the motor shaft and extends approximately through the belt portion to which the motor torque is applied; and yielding means tending to rock the motor about said axis so as to tighten the belt.

3. In combination with an electric motor having a pulley and a driven belt thereon, means supporting the motor for rotation about an axis parallel to the motor shaft and extending approximately through the driving belt side where it initially contacts the motor pulley.

4. In combination with an electric motor having a V-grooved pulley and a driven V-shaped belt thereon, means supporting the motor for rotation about an axis parallel to the motor shaft and extending approximately through the driving belt side where it initially contacts the pulley in the mean diameter of the V-groove thereof.

5. In combination with a belt-driving electric motor, means supporting the motor for rotation about an axis which is parallel to the motor shaft and extends approximately through the belt portion to which the motor torque is applied; and means frictionally resisting rotation of the motor about said axis.

6. In combination with a belt-driving electric motor, means supporting the motor for rotation about an axis which is parallel to the motor shaft and extends approximately through the belt portion to which the motor torque is applied; means frictionally resisting rotation of the motor about said axis; and yielding means tending to rock the motor about said axis so as to tighten the belt.

7. In combination with a belt-driving electric motor, a cradle carrying pivots on which the motor is journaled for rotation about an axis which is parallel to the motor shaft and extends approximately through the belt portion to which the motor torque is applied.

8. In combination with a belt-driving electric motor, a cradle carrying pivots on which the motor is journaled for rotation about an axis which is parallel to the motor shaft and extends approximately through the belt portion to which the motor torque is applied; and a spring tending to rock the motor about its pivot support so as to tighten the belt.

9. In combination with a belt-driving electric motor, a cradle carrying headed pivot; arcuate brackets floatingly pivotally mounted with their ends on the motor ends and journaled with their middle portions on the pivots; fibrous washers on the pivots and interposed between the brackets and the cradle; dished springs on the pivots and interposed between the pivot heads and the brackets for urging the latter into frictional engagement with the washers; and yielding means normally rocking the motor about its pivot support so as to tighten the belt.

10. In combination with a belt-driving electric motor, a cradle carrying headed pivots; fibrous bushings journaled on the pivots and interposed between the cradle and the pivot heads; arcuate brackets floatingly pivotally mounted with their ends on the motor ends and journaled with their middle portions on the bushings; fibrous washers on the bushings and interposed between the brackets and the cradle; yielding means normally urging the brackets into frictional engagement with the washers; and other yielding means normally rocking the motor about its pivot support so as to tighten the belt.

11. In combination with a belt-driving electric motor, a cradle carrying headed pivots; fibrous bushings, each having an annular shoulder and being journaled on a pivot and interposed between the cradle and the pivot head; arcuate brackets floatingly pivotally mounted with their ends on the motor ends and journaled with their middle portions on the pivots; fibrous washers on the pivots and interposed between the brackets and the cradle; dished springs on the bushings and being interposed between the annular shoulders of the bushings and the brackets for urging the latter into frictional engagement with the washers; and yielding means normally rocking the motor about its pivot support so as to tighten the belt.

12. In combination with a belt-driving electric motor, a cradle carrying headed pivots; fibrous bushings, each having an annular shoulder and being journaled on a pivot and interposed between the cradle and the pivot head; arcuate brackets floatingly pivotally mounted with their ends on the motor ends and journaled with their middle portions on the bushings; fibrous washers on the bushings and interposed between the brackets and the cradle; dished springs on the bushings and bearing with their central portions against the annular shoulders of the bushings and with their peripheral portions against the brackets for urging the latter into frictional engagement with the washers; and yielding means normally rocking the motor about its pivot support so as to tighten the belt.

13. In combination with a belt-driving electric motor, a cradle carrying pivots; arcuate brackets floatingly pivotally mounted with their ends on the motor ends and journaled with their middle portions on the pivots; fibrous washers on the pivots and interposed between the brackets and the cradle; metal washers on the pivots; springs on the pivots and interposed between the metal washers and the brackets for urging the latter into frictional engagement with the fibrous washers; springs interposed between the metal washers and the motor for taking up endplay of the latter; and yielding means normally rocking the motor about its pivot support so as to tighten the belt.

14. In combination with a belt-driving electric motor having a recess in each end; a cradle carrying pivots; arcuate brackets floatingly pivotally mounted with their ends on the motor ends and journaled with their middle portions on the pivots; fibrous washers on the pivots and interposed between the brackets and the cradle; metal washers on the pivots; dished springs on the pivots and interposed between the metal washers and the brackets for urging the latter into frictional engagement with the fibrous washers; helical compression springs interposed between the metal washers and the recesses of the motor for taking up endplay of the latter; and yielding means normally rocking the motor about its pivot support so as to tighten the belt.

15. In combination with a belt-driving electric motor, a cradle carrying pivots; arcuate brackets floatingly pivotally mounted with their ends on the motor ends and journaled with their middle portions on the pivots for rotation of the motor about an axis which is parallel to the motor shaft and extends approximately through the belt portion to which the motor torque is applied; fibrous washers on the pivots and interposed between the brackets and the cradle; yielding means normally urging the brackets into frictional engagement with the washers; and other yielding means normally rocking the motor about its pivot support so as to tighten the belt.

16. In combination with a belt-driving electric motor, a cradle carrying headed pivots; arcuate brackets floatingly pivotally mounted with their ends on the motor ends and journaled with their middle portions on the pivots for rotation of the motor about an axis which is parallel to the motor shaft and extends approximately through the belt-portion to which the motor torque is applied; fibrous washers on the pivots and interposed between the brackets and the cradle; dished springs on the pivots and interposed between the pivot heads and the brackets for urging the latter into frictional engagement with the washers; and yielding means normally rocking the motor about its pivot support so as to tighten the belt.

17. In combination with a belt-driving electric motor, a cradle carrying headed pivots; fibrous bushings journaled on the pivots and interposed between the cradle and the pivot heads; arcuate brackets floatingly pivotally mounted with their ends on the motor ends and journaled with their middle portions on the bushings for rotation of the motor about an axis which is parallel to the motor shaft and extends approximately through the belt-portion to which the motor torque is applied; fibrous washers on the bushings and interposed between the brackets and the cradle; yielding means normally urging the brackets into frictional engagement with the washers; and other yielding means normally rocking the motor about its pivot support so as to tighten the belt.

18. In combination with a belt-driving electric motor, a cradle carrying pivots; arcuate brackets floatingly pivotally mounted with their ends on the motor ends and journaled with their middle portions on the pivots for rotation of the motor about an axis which is parallel to the motor shaft and extends approximately through the belt-portion to which the motor torque is applied; fibrous washers on the pivots and interposed between the brackets and the cradle; metal washers on the pivots; springs on the pivots and interposed between the metal washers and the brackets for urging the latter into frictional engagement with the fibrous washers; and springs interposed between the metal washers and the motor for taking up endplay of the latter.

19. In combination with a belt-driving electric motor, a cradle carrying headed pivots; fibrous bushings on the pivots and being interposed between the pivot heads and the cradle; arcuate brackets floatingly pivotally mounted with their ends on the motor ends and journaled with their middle portions on the bushings for rotation of the motor about an axis which is parallel to the motor shaft and extends approximately through the belt-portion to which the motor torque is applied; fibrous washers on the bushings and interposed between the brackets and the cradle; metal washers on the bushings; springs on the bushings and interposed between the metal washers and the brackets for urging the latter into frictional engagement with the fibrous washers; and helical springs interposed between the metal washers and the motor for taking up endplay of the latter.

20. In combination with a belt driving electric motor carrying rubber members on both ends, a cradle carrying pivots; arcuate brackets mounted with their ends on the rubber members of the motor; fibrous washers on the pivots and interposed between the cradle and the brackets, the middle portions of said brackets being journaled on the fibrous washers of the pivots; yielding means normally urging the brackets into frictional engagement with said interposed washers; and other yielding means normally rocking the motor about its pivot support so as to tighten the belt.

CARL H. KINDL.
CLEMENT J. ROWE.